United States Patent [19]

Nakamura et al.

[11] Patent Number: 4,840,766

[45] Date of Patent: Jun. 20, 1989

[54] METHOD OF AND APPARATUS FOR CONTROLLING STEAM VENT VOLUME OF MOISTURE SEPARATOR REHEATERS

[75] Inventors: Shozo Nakamura, Hitachiota; Tokunori Mathusima, Ibaraki; Kunio Tsuji, Hitachi, all of Japan

[73] Assignee: Hitachi, Ltd., Tokyo, Japan

[21] Appl. No.: 545,242

[22] Filed: Oct. 25, 1983

[30] Foreign Application Priority Data

Oct. 26, 1982 [JP] Japan ................................ 57-186871

[51] Int. Cl.$^4$ ............................................. G21D 3/00
[52] U.S. Cl. .................................... 376/378; 376/216; 376/371
[58] Field of Search ................... 60/686; 376/215, 216, 376/283, 366, 370, 371, 378

[56] References Cited

U.S. PATENT DOCUMENTS

| | | | |
|---|---|---|---|
| 3,360,939 | 1/1968 | Beldecos | 60/686 |
| 4,106,559 | 8/1978 | Ritland et al. | 165/111 |
| 4,472,345 | 9/1984 | Tanji et al. | 376/216 |

Primary Examiner—Deborah L. Kyle
Assistant Examiner—Richard W. Wendtland
Attorney, Agent, or Firm—Antonelli, Terry & Wands

[57] ABSTRACT

In moisture separator reheaters of a nuclear power plant, a control valve is mounted in a steam vent line of the plant to control the flow rate of vent steam in conformity with the load applied to the plant, to thereby avoid the occurrence of any instable flow phenomenon in the entire range of loads applied to the plant.

4 Claims, 4 Drawing Sheets

METHOD OF AND APPARATUS FOR CONTROLLING STEAM VENT VOLUME OF MOISTURE SEPARATOR REHEATERS

BACKGROUND OF THE INVENTION

This invention relates to a method of controlling the flow rate of vent steam of moisture separator reheaters of a nuclear power plant and a control apparatus suitable for carrying the aforesaid method into practice.

DESCRIPTION OF THE PRIOR ART

Figure 1:
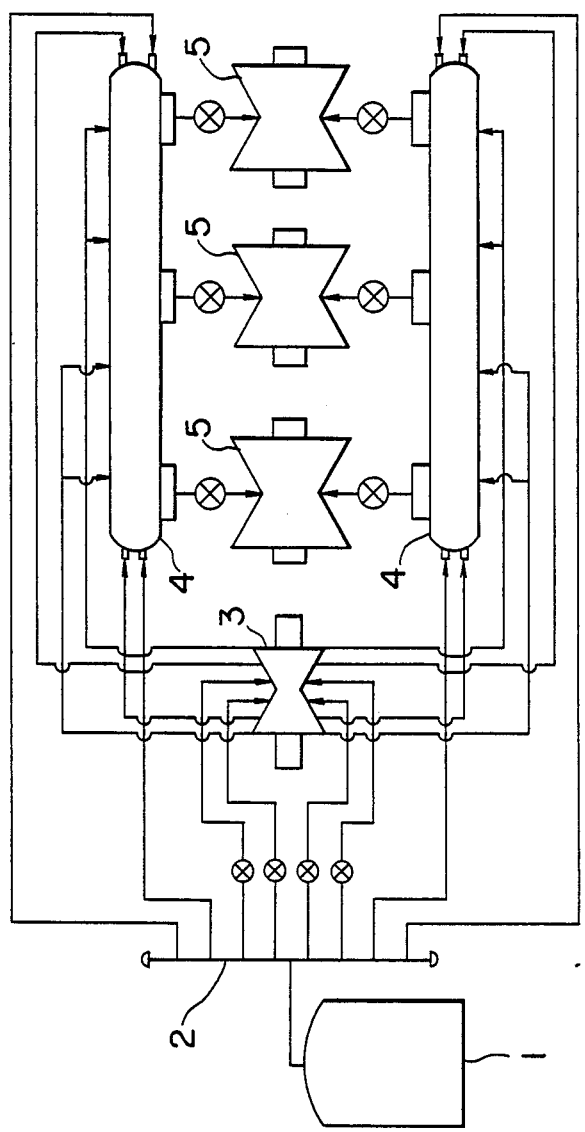
FIG. 1 is a diagrammatic view showing the flow of steam to and from the moisture separator reheaters of a nuclear power plant of the prior art.

Referring to FIG. 1, steam generated in a nuclear reactor 1 flows through a steam header 2 into a higher pressure turbine 3, and a portion of the steam flows into moisture separator reheaters 4 to serve as a heating steam. Bleed steam extracted from the higher pressure turbine 3 also flows into the moisture separator reheaters 4 to serve as a heating steam, and steam exhaust from the higher pressure turbine 3 flows into the moisture separator reheaters 4 as a steam to be heated. The steam exhaust of the higher pressure turbine 3 flows into lower pressure turbines 5 after being reheated in the moisture separator reheaters 4.

The purpose of the moisture separator reheaters 4 is to improve thermal efficiency of the steam cycle by removing moisture from the steam exhaust of the higher pressure turbine and then feeding same to the lower pressure turbines as a superheated steam.

Figure 2:
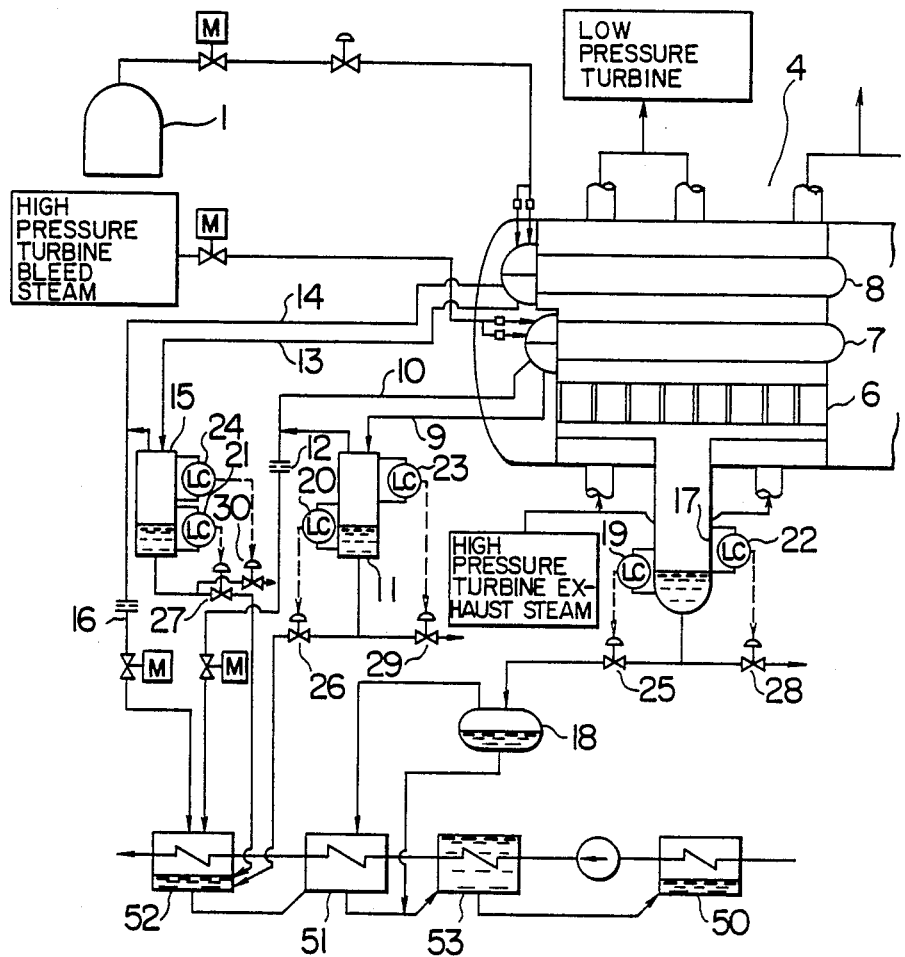
FIG. 2 is a view in explanation of the internal structure of the moisture separator reheater shown in FIG. 1 and of the steam flow and control system for equipment associated with the reheater.

The construction of the moisture separator reheaters 4 of the prior art, the system of pipes therefor and the control system therefor will be outlined by referring to FIG. 2. Each moisture separator reheater 4 comprises a moisture separator 6 for removing moisture from the higher pressure turbine steam exhaust, a first stage reheater 7 for reheating the steam, from which the moisture has been removed, by the higher pressure turbine bleed steam to produce superheated steam, and a second stage reheater 8 for further reheating the steam, which has been reheated in the first stage reheater 7, by steam direct from the nuclear reactor to obtain a more superheated steam. The higher pressure turbine bleed steam and the steam from the nuclear reactor each serving as a heating steam flow through heat transfer tubes of first stage reheater 7 and second stage reheater 8, respectively, to give off heat to the steam to be heated which flows outside the heat transfer tubes, so that the heating steam is condensed in the respective heat transfer tube into a two-phase mixture of steam and water. Meanwhile the steam to be heated which flows outside each heat transfer tube exits from the moisture separator reheaters 4 after being heated into superheated steam and flows into the lower pressure turbines.

The water of the two-phase mixture of steam and water produced by condensation in the heat transfer tube of the first stage reheater 7 flows through a drain line 9 into a first stage reheater drain tank 11 and the steam of the two-phase mixture is led to a steam vent line 10 and flows through an orifice 12 into a feedwater heater 52 where the heat is recovered from the steam. Likewise, the water included in the two-phase mixture of steam and water produced by condensation in the heat transfer tube of the second stage reheater 8 flows through a drain line 13 into a second stage reheater drain tank 15. However, the steam in the two-phase mixture is led to a steam vent line 14 and flows through an orifice 16 into the feedwater heater 52 where the heat is recovered from the steam.

The control system for the system of the aforesaid construction will be described. The drain flowing into each of a moisture separator tank 17, the first stage reheater drain tank 11 and the second stage reheater drain tank 15 has its level controlled by one of level control means 19, 20 and 21 and flows through one of level control valves 25, 26 and 27 into a drain tank 18 and feedwater heaters 52. Meanwhile the vent steam from each of the first stage reheater 7 and second stage reheater 8 has its volume regulated by one of the orifices 12 and 16 respectively provided to the vent steam lines 10 and 14 respectively.

One of the problems which arise in the moisture separator reheaters 4 of the aforesaid construction of the prior art is how to avoid an instable flow phenomenon exhibited by the two-phase mixture of steam and water produced by condensation in the heat transfer tubes of the first stage reheater 7 and second stage reheater 8. In the event that the condition of instable flow of the two-phase mixture of steam and water occurs in the heat transfer tubes, the performance of the reheaters would be reduced and a problem would be raised with regard to the strength of the heat transfer tubes, such as the thermal deformation of thermal fatigue of the material thereof. Thus, it is necessary to avoid by all means the occurrence of the phenomenon of instable flow of the two-phase mixture of steam and water in the heat transfer tubes. The end can be attained by using the process of controlling the flow rate of the vent steam. However, when a process of the prior art relying on orifices for controlling the flow rate of steam as shown in FIG. 2 is used, it would be impossible to effect control appropriately in conformity with variations in the load applied to the plant. Thus, in actual practice, it is only when the plant operates under rated load condition that the flow rate control of the vent steam is effected appropriately. Thus, the process using the orifices as shown in FIG. 2 would be able to achieve satisfactory results in avoiding the phenomenon of instable flow of the two-phase mixture of steam and water in the heat transfer tubes.

SUMMARY OF THE INVENTION

This invention has been developed for the purpose of obviating the aforesaid disadvantage of the prior art. Accordingly, the invention has as its object the provision of a method of and an apparatus for controlling the flow rate of vent steam capable of avoiding the occurrence of the phenomenon of instable flow of the two-phase mixture of steam and water produced by condensation in the heat transfer tubes in the entire range of operation of a nuclear power plant.

One of the outstanding characteristics of the invention enabling the aforesaid object to be accomplished is that the method of controlling the flow rate of vent steam comprises the step of mounting a control valve in each vent steam line of each moisture separator reheater of a nuclear power plant to effect control of the flow rate of the vent steam in conformity with a load applied to the plant, to thereby avoid the occurrence of the phenomenon of instable flow of a two-phase mixture of steam and water in the entire range of loads applied to the plant.

Another outstanding characteristic of the invention enabling the aforesaid object to be accomplished is that the apparatus for controlling the flow rate of vent steam comprises, for the purpose of readily carrying the aforesaid control method into practice and achieving desired effect, a control valve mounted in each steam vent line of each moisture separator reheater of a nuclear power plant so as to be able to control the flow rate of the vent steam in conformity with a load applied to the plant.

DETAILED DESCRIPTION OF THE PREFERRED EMBODIMENTS

A preferred embodiment of the control method and control apparatus according to the invention will be described in detail by referring to FIG. 3.

Figure 3:
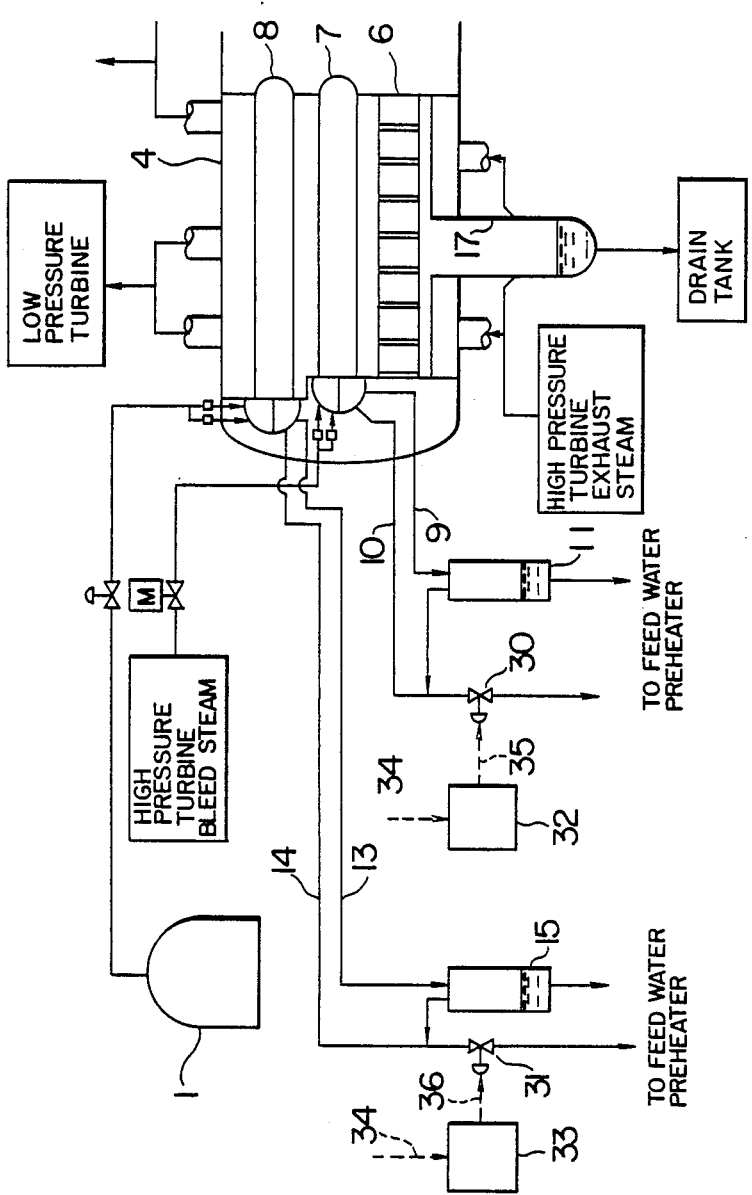
FIG. 3 is a view of one embodiment of the invention corresponding to FIG. 2 of the prior art.

FIG. 3 shows one embodiment of the invention which represents an improvement in the apparatus for controlling the flow rate of vent steam of moisture separator reheaters of the prior art shown in FIG. 2 which is suitable for carrying into practice the control method according to the invention for controlling the flow rate of vent steam of moisture separator reheaters. In FIG. 3, parts similar to those shown in FIG. 2 in construction and operation are designated by like reference characters, including the nuclear reactor 1, moisture separator reheaters 4, moisture separator 6, first stage reheater 7, second stage reheater 8, drain line 9, first stage reheater drain tank 11, second stage reheater drain tank 15 and moisture separator tank 17. The numerals 10 and 14 designate vent steam lines of the control apparatus according to the invention.

A vent steam volume control valve 30 is mounted in the vent steam line 10 of the first stage reheater 7, and a vent steam flow rate control unit 32 is provided to give a command signal 35 to the control valve 30. The numeral 34 designates a signal corresponding to a load which is input to the control unit 32.

The aforementioned signal 34 is a signal representing the condition of the load applied to the nuclear power plant. Such signal may be produced by sensing a turbine inlet steam pressure or, when the plant is a power generating plant, a generator output.

Likewise, a vent steam flow rate control valve 31 is mounted in the steam vent line 14 of the second stage reheater 8, and a vent steam flow rate control unit 33 is provided to give a command signal 36 to the control valve 31. The numeral 34 designates a signal corresponding to a load which is referred to hereinabove.

Figure 4A:
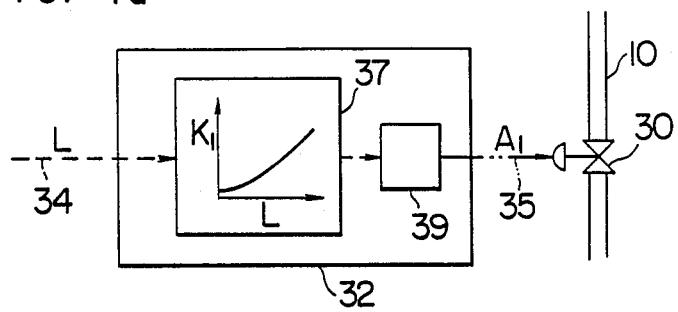
FIGS. 4(A) and 4(B) are views in functional explanation of the apparatus for controlling the flow rate of vent steam shown in FIG. 3.
Figure 4B:
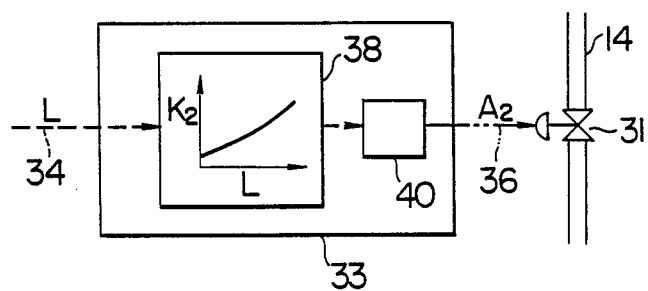

FIG. 4(A) is a diagram in functional explanation for the vent steam flow rate control unit 32, and FIG. 4(B) is for the vent steam flow rate control unit 33.

The vent steam flow rate control unit 32 comprises a function generator 37 producing a valve opening signal $K_1$ to the control valve 30 corresponding to load L, and a valve opening signal fine adjuster 39.

It is possible to determine beforehand the flow rates of steam which would be necessary for avoiding the occurrence of instable flow of a two-phase mixture of steam and water produced by condensation in the heat transfer tubes in conformity with loads applied to the plant. In the present invention, L–$K_1$ functions are prepared and stored in the function generator 37 beforehand to cause the steam to flow in the flow rates described hereinabove. Likewise, the control unit 33 comprises a function generator 38 producing a valve opening signal $K_2$ to the control valve 31 as corresponding to the load L, and a valve opening signal fine adjuster 40 functions are prepared and stored beforehand in the function generator 38 in the same manner as described by referring to the function generator 37.

When the apparatus for controlling the vent steam flow rate of moisture separator reheaters constructed as described hereinabove is used, control of the openings of the control valves 30 and 31 mounted in the vent steam lines 10 and 14 respectively is automatically effected in such a manner that the vent steam is allowed to flow in a flow rate which is necessary and enough to present the occurrence of an instable flow condition of a two-phase mixture of steam and water produced by condensation in the heat transfer tubes, in conformity with the load L applied to the plant. Thus, the occurrence of the instable flow phenomenon can be avoided in the entire range of loads applied to the plant.

Figure 5:
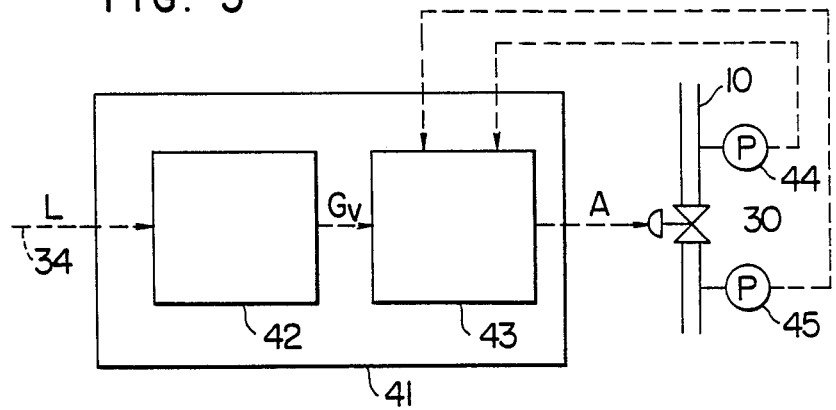
FIG. 5 is a view in functional explanation of another embodiment of the invention.

FIG. 5 is a diagram in functional explanation of the apparatus of another embodiment of the present invention. The figure shows a vent steam flow rate control unit 41 applied to the first stage reheater system, but similar unit can be applied to the second stage reheater system as well. As shown, the control unit 41 comprises a function generator 42 defining the relation between the plant load and the vent steam flow rate, and a calculator 43 producing a demand signal for the control valve 30 by comparing the required vent steam flow rate Gv with pressure signals delected by the pressure sensors 44 and 45 located upstream and downstream of the control valve 30 respectively. The function generator 42 has stored therein vent steam flow rate which would be necessary to avoid the occurrence of an instable flow condition of the two-phase mixture in the heat transfer tubes in the event that conceivable changes occurred in the load applied to the plant.

As described hereinabove, in the second embodiment of the control apparatus in conformity with the invention, the pressure sensors 44 and 45 are mounted upstream and downstream, respectively, of the control valve 30 and produce pressure signals which are supplied to the calculator 43 performing calculation on them to produce a necessary valve opening signal for the control valve 30, so as to effect control of the control valve 30 based on the output of the function generator 42 and the pressure signals of the pressure sensors 44 and 45. In the second embodiment constructed as described hereinabove, it is possible to carry into practice the method of controlling the vent steam flow rate according to the invention with increased precision and in automatic manner.

From the foregoing description, it will be appreciated that the method of controlling the vent steam flow rate of moisture separator reheaters according to the invention is capable, when incorporated in moisture separator reheaters of a nuclear power plant, of avoiding the occurrence of an instable flow phenomenon in the entire range of loads applied to the plant by effecting control of the flow rate of the vent steam in conformity with the load applied to the plant by means of a control valve mounted in a vent steam line of the plant. It will also be appreciated that the apparatus for controlling the vent steam flow rate of moisture separator reheaters according to the invention is capable of readily carrying the aforesaid control method into practice and enabling same to achieve desired effects by mounting a control valve in a vent steam line so as to enable the vent steam flow rate to be controlled in conformity with the load applied to the plant.

What is claimed is:

1. A method of controlling the flow rate of steam of moisture separator reheaters of a nuclear power plant, comprising the steps of:

mounting a control valve in a steam vent line of a moisture separator reheater to effect control of the flow rate of the vent steam in conformity with the loud applied to the plant, storing information in a function generator on the functional relationship between loads applied to the plant and openings of the control valve, providing a signal to the function generator corresponding to a load applied to the plant, and providing a command signal to the control valve for adjusting the control valve opening, to thereby avoid the occurrence of an instable flow phenomenon in the entire range of loads applied to the plant.

2. A method of controlling the flow rate of steam of moisture separator reheaters of a nuclear power plant, comprising the steps of:

mounting a control valve in a steam vent line of a moisture separator reheater to effect control of the flow rate of the vent steam in conformity with the loud applied to the plant, storing information in a function generator on the functional relationship between loads applied to the plant and openings of the control valve to avoid an unstable flow condition of heat transfer tubes in the moisture separator reheaters, mounting pressure sensors upstream and downstream of the control valve, providing pressure signals from the pressure sensors to a calculator, supplying a required vent steam flow rate signal from the function generator to the calculator, comparing by means of the calculator the required vent steam flow rate signal with the pressure signals, and providing the necessary valve opening signal from the calculator for the control valve based on the signals from the function generator and the pressure sensors, to thereby avoid the occurrence of an instable flow phenomenon in the entire range of loads applied to the plant.

3. In a nuclear power plant, an apparatus for controlling the flow rate of vent steam moisture separator reheaters having a drain water discharging line and a vent steam discharging line comprising:

a control valve mounted in a vent steam line of a moisture separator reheater to effect control of the flow rate of the vent steam in conformity with the load applied to the plant, and a function generator means for storing information on the functional relation between the loads applied to the plant and openings of the control valve, said function generator means producing an output signal to control the control valve.

4. In a nuclear power plant an apparatus for controlling the flow rate of vent steam moisture separator reheaters having a drain water discharging line and a vent steam discharging line comprising:

a control valve mounted in a vent steam line of a moisture separator reheater to effect control of the flow rate of the vent steam in conformity with the load applied to the plant, and a function generator means for storing information on the functional relation between the loads applied to the plant and openings of the control valve, a pressure sensor located upstream of the control valve, a pressure sensor located downstream of the control valve, and a calculator performing calculations on an output signal of the function generator means and output signals of the two pressure sensors to produce a valve opening signal supplied to the control valve to effect control thereof.

* * * * *